US012327840B2

United States Patent
Clark et al.

(10) Patent No.: US 12,327,840 B2
(45) Date of Patent: Jun. 10, 2025

(54) METHOD OF PROCESSING LAYERED STRUCTURES

(71) Applicant: Ilika Technologies Ltd, Romsey (GB)

(72) Inventors: Owain Clark, Southampton (GB); Louise Turner, Salisbury (GB); Brian Elliott Hayden, Lyndhurst (GB); Thomas Risbridger, Southampton (GB); Thomas Foley, Southampton (GB); Sara Aghdaei, Southampton (GB)

(73) Assignee: Ilika Technologies Ltd, Romsey (GB)

( * ) Notice: Subject to any disclaimer, the term of this patent is extended or adjusted under 35 U.S.C. 154(b) by 745 days.

(21) Appl. No.: 17/435,804

(22) PCT Filed: Mar. 12, 2020

(86) PCT No.: PCT/GB2020/050621
§ 371 (c)(1),
(2) Date: Sep. 2, 2021

(87) PCT Pub. No.: WO2020/183184
PCT Pub. Date: Sep. 17, 2020

(65) Prior Publication Data
US 2022/0052384 A1 Feb. 17, 2022

(30) Foreign Application Priority Data
Mar. 14, 2019 (GB) ........................... 1903512

(51) Int. Cl.
*H01M 10/0585* (2010.01)
*H01M 10/0525* (2010.01)
(Continued)

(52) U.S. Cl.
CPC ... *H01M 10/0585* (2013.01); *H01M 10/0525* (2013.01); *H01M 10/0562* (2013.01);
(Continued)

(58) Field of Classification Search
CPC ............. H01M 10/0585; H01M 50/11; H01M 10/0525; H01M 10/0562; H01M 2220/30; H01M 2300/0071
(Continued)

(56) References Cited

U.S. PATENT DOCUMENTS 7,094,500 B2   8/2006  Ugaji et al.
7,442,468 B2  10/2008  Chen
(Continued)

FOREIGN PATENT DOCUMENTS

EP   2044642 B1   2/2014
EP   2212962 B1   7/2017
(Continued)

OTHER PUBLICATIONS

Oliveira, et al., "The causes and effects of degradation of encapsulant ethylene vinyl acetate copolymer (EVA) in crystalline silicon photovoltaic modules: A review," Renewable and Sustainable Energy Reviews, 81, 2018, pp. 2299-2317.
(Continued)

*Primary Examiner* — Allison Bourke
*Assistant Examiner* — Robert Gene West
(74) *Attorney, Agent, or Firm* — Renner, Otto, Boisselle & Sklar, LLP

(57) ABSTRACT

A method of processing a stack of layers to provide a stack of discrete layer elements, comprises the steps of: providing a stack of layers comprising: #a first layer (20) provided by a first material; #a third layer (16) provided by a solid electrolyte; and #a second layer (18) located between the first and third layers, the second layer having a thickness of at least 500 nm and being provided by a second material comprising at least 95 atomic % amorphous silicon; removing a through-thickness portion of the first layer (20) to form a first discrete layer element (20*a*) provided by the first
(Continued)

material; removing a through-thickness portion of the second layer (18) to form a second discrete layer element (18a) provided by the second material, the second discrete layer element being located between the first discrete layer element (20a) and the solid electrolyte; and etching the third layer (16) using the second discrete layer element (18a) as an etching mask, to form a third discrete layer element (16a) provided by the solid electrolyte; wherein the first, second and third discrete layer elements provide the stack of discrete layer elements.

6 Claims, 8 Drawing Sheets

(51) Int. Cl.
  *H01M 10/0562* (2010.01)
  *H01M 50/11* (2021.01)
(52) U.S. Cl.
  CPC ........ *H01M 50/11* (2021.01); *H01M 2220/30* (2013.01); *H01M 2300/0071* (2013.01)
(58) Field of Classification Search
  USPC ....................................................... 429/162
  See application file for complete search history.

(56) References Cited

U.S. PATENT DOCUMENTS

| | | | |
|---|---|---|---|
| 9,373,864 | B2 | 6/2016 | Oukassi et al. |
| 2004/0258984 | A1 | 12/2004 | Ariel et al. |
| 2006/0286448 | A1 | 12/2006 | Snyder et al. |
| 2007/0067984 | A1 | 3/2007 | Gaillard et al. |
| 2011/0311883 | A1* | 12/2011 | Oukassi ............. H01M 6/18 216/13 |
| 2012/0321938 | A1 | 12/2012 | Oukassi et al. |
| 2017/0018810 | A1 | 1/2017 | Ladroue et al. |
| 2017/0139095 | A1* | 5/2017 | Nielson ............. G02B 5/3058 |
| 2018/0351210 | A1* | 12/2018 | Ladroue ............. H01M 4/0407 |

FOREIGN PATENT DOCUMENTS

| | | | |
|---|---|---|---|
| JP | 2003077529 A * | 3/2003 | |
| JP | 2009509289 A | 3/2009 | |
| JP | 2011243577 A | 12/2011 | |
| JP | 2013521602 A | 6/2013 | |
| JP | 2014032892 A | 2/2014 | |
| WO | 2008/134053 | 11/2008 | |
| WO | WO-2008134053 A1 * | 11/2008 | ......... B23K 26/0624 |

OTHER PUBLICATIONS

Seethamraju, et al., "Encapsulation for Improving the Efficiencies of Solar Cell," Materials and Processes for Solar Fuel Production, Nanostructure Science and Technology 174, 2014, DOI 10.1007/978-1-4939-1628-3_2.

Gaines, et al., "Lithium-Ion Battery Production and Recycling Materials Issues," VTO Annual Merit Review Jun. 9, 2015, https://www.energy.gov/sites/prod/files/2015/06/f23/es229_gaines_2015_o.pdf.

Zou, et al., "A novel method to recycle mixed cathode materials for lithium ion batteries†," Green Chem., 2013, 15, 1183.

Whitacre, et al;., "A Combinatorial Study of LiyMnxNi2AxO4 Cathode Materials Using Microfabricated Solid-State Electrochemical Cells," J. Electrochem. Soc., 2003, 150, A1676-83.

Khatri, et al., "Study on long term reliability of photo-voltaic modules and analysis of power degradation using accelerated aging tests and electroluminescence technique," Energy Procedia 8 (2011) 396-401.

Kumar, et al., "Performance assessment and degradation analysis of solar photovoltaic technologies: A review," Renewable and Sustainable Energy Reviews 78 (2017) 554-587.

Chen, et al., "Recovery of Valuable Metals from Lithium-Ion Batteries NMC Cathode Waste Materials by Hydrometallurgical Methods," Metals 2018, 8, 321; doi:10.3390/met8050321.

Ndiaye, et al., "Degradations of silicon photovoltaic modules: A literature review," Solar Energy 96 (2013) 140-151.

Whitacre, et al, "A Combinatorial Study of LiyMnxNi2AxO4 Cathode Materials Using Microfabricated Solid-State Electrochemical Cells," Journal of The Electrochemical Society, 150, 12, A1676-A1683, 2003.

International Search Report and Written Opinion mailed May 25, 2020 in corresponding International Application No. PCT/GB2020/050621.

United Kingdom Search Report mailed Sep. 19, 2019 in corresponding United Kingdom Application No. GB1903512.0.

Japanese Office for corresponding Japanese Patent Application No. 2021-550297, issued Aug. 27, 2024, with English translation.

* cited by examiner

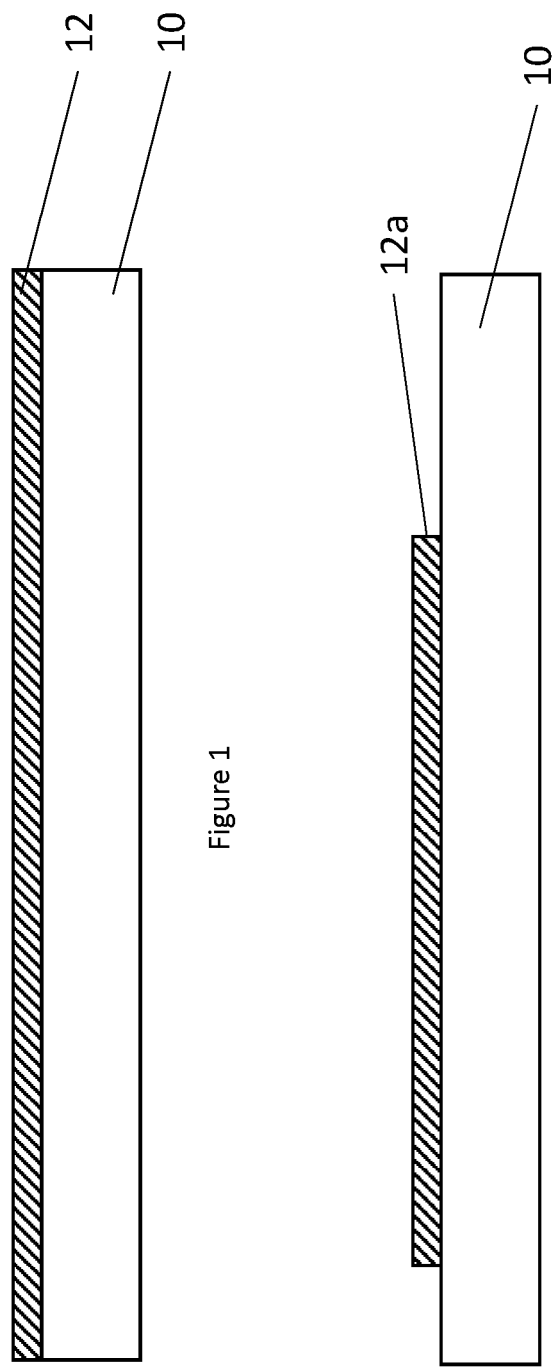

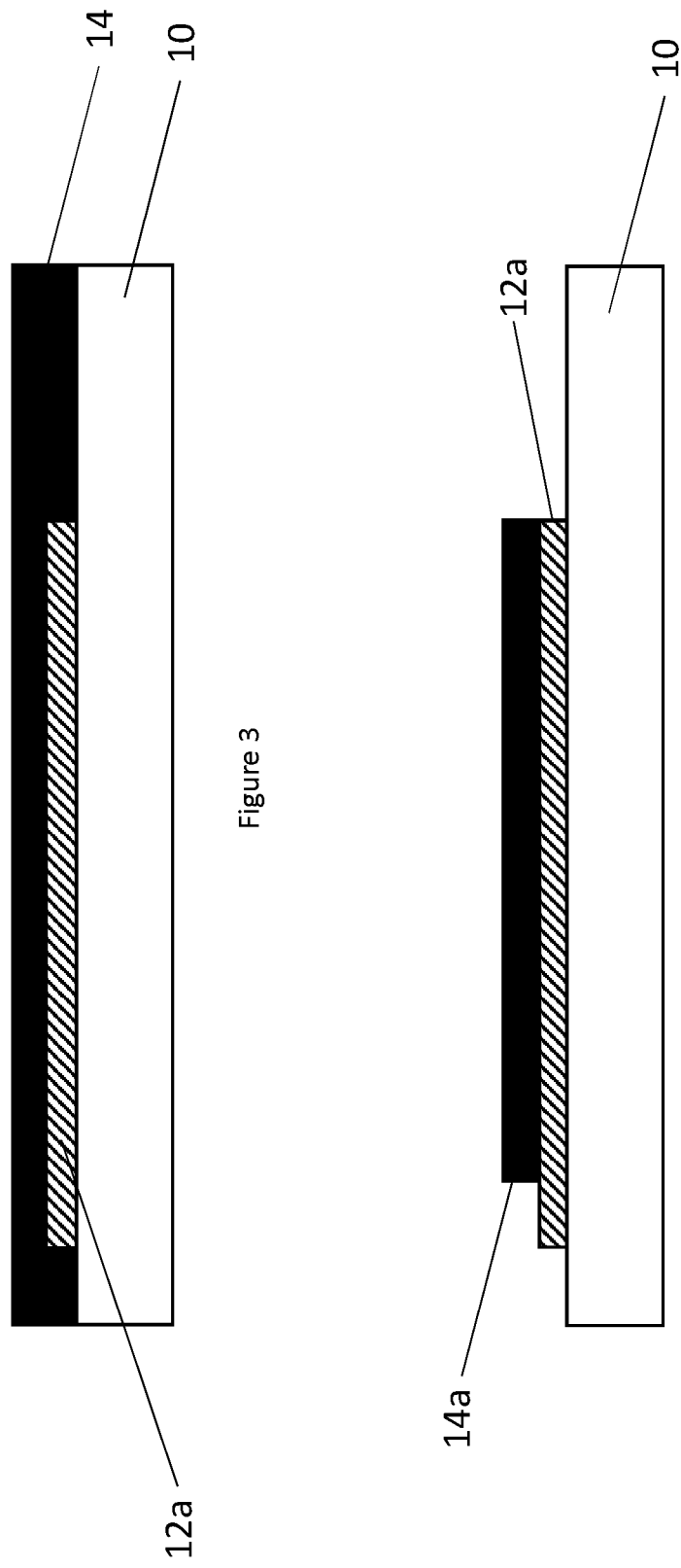

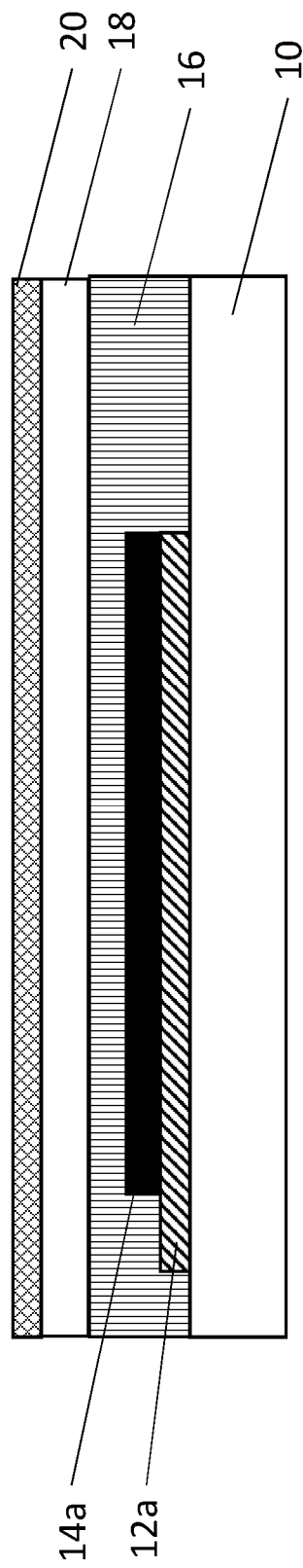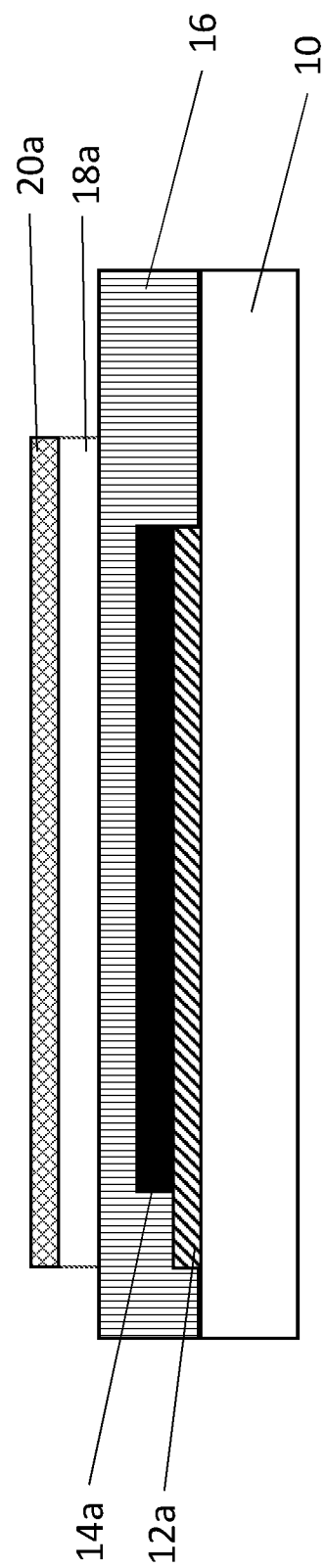

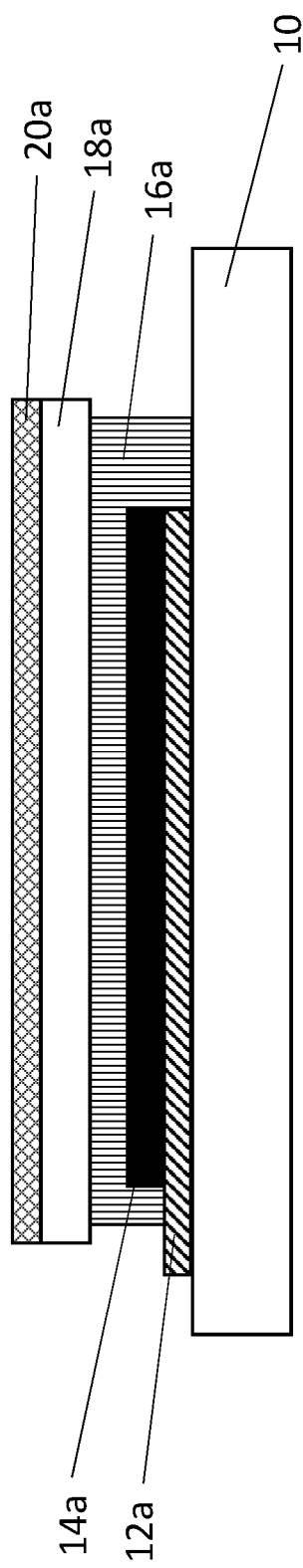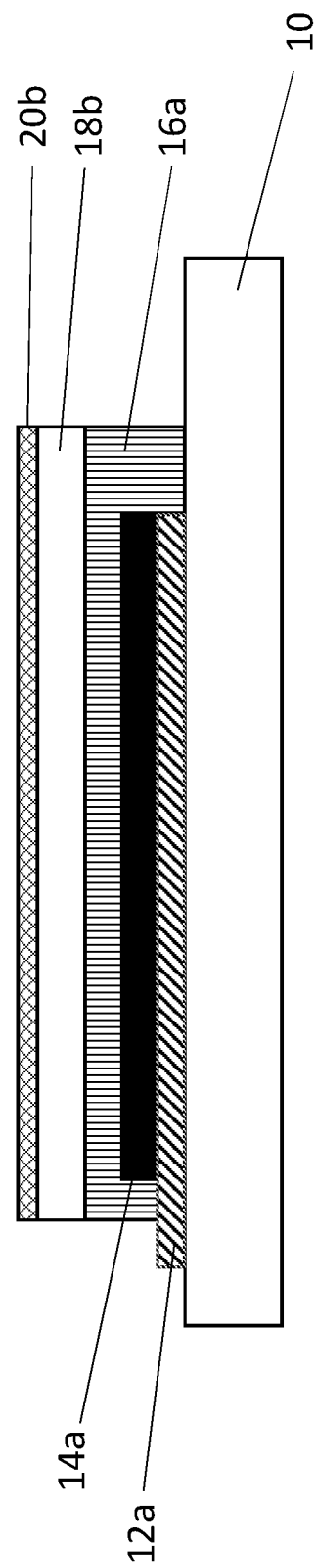

METHOD OF PROCESSING LAYERED STRUCTURES

This application is a national phase of International Application No. PCT/GB2020/050621 filed Mar. 12, 2020, which claims priority to United Kingdom Application No. 1903512.0 filed Mar. 14, 2019, the entire disclosures of which are hereby incorporated by reference.

FIELD OF THE INVENTION

The present invention relates to a method for processing layered structures, particularly layered structures in which the layers are provided by the components of a battery.

BACKGROUND TO THE INVENTION

Solid state microbatteries typically comprise an active stack of thin layers. The active stack is formed by two electrodes (an anode and a cathode) that are separated by a solid state electrolyte. Typically, an anode current collector is provided on the face of the anode that is opposed to the electrolyte, and a cathode current collector is provided on the face of the cathode that is opposed to the electrolyte.

Typically, solid state microbatteries are formed by depositing the individual thin layers on a wafer. For reasons of efficiency, multiple microbatteries are generally formed on a single wafer. This requires each battery component (for example, cathode, anode, or electrolyte) to be provided as a layer comprising multiple discrete elements, each discrete element providing part of a respective microbattery. The multiple discrete elements typically form a regular array on the surface of the wafer.

The process of providing a layer comprising multiple discrete elements is known as "patterning" the layer. This may be achieved by depositing the layer through a shadow mask presenting a plurality of apertures. The mask is placed on the surface of the substrate and held in position throughout the deposition. The shadow mask is then removed, and the deposited layer presents the required distribution of discrete elements, that is, the required pattern.

This masking technique has the disadvantage that it may generate particle contamination on the surface of the substrate, thus adversely affecting the performance of the microbattery. Additionally, the process of placing the mask on the substrate may result in scratching of the substrate, which also has a deleterious effect on battery performance. Furthermore, when the size of the microbattery is small, masking can generate edge or shadow effects, resulting in poor alignment of discrete layer elements within individual stacks and/or large wasted areas between stacks.

Thus, it is often desired to avoid masking techniques and to use alternative patterning techniques such as etching of the deposited layers. Due to the different physical and chemical properties of the layers, this may require the layers to be etched individually. However, this process may have an adverse effect on the quality of the interface between the etched layer and the layer deposited subsequently.

Therefore, it is desirable to provide a method of patterning the layers of a stacked structure, while reducing these adverse effects.

SUMMARY OF THE INVENTION

In a first aspect, the present invention may provide a method of processing a stack of layers to provide a stack of discrete layer elements, comprising the steps of:

providing a stack of layers comprising:
 a first layer provided by a first material;
 a third layer provided by a solid electrolyte; and
 a second layer located between the first and third layers, the second layer having a thickness of at least 500 nm and being provided by a second material comprising at least 95 atomic % amorphous silicon;
removing a through-thickness portion of the first layer to form a first discrete layer element provided by the first material;
removing a through-thickness portion of the second layer to form a second discrete layer element provided by the second material, the second discrete layer element being located between the first discrete layer element and the solid electrolyte; and
etching the third layer using the second discrete layer element as an etching mask, to form a third discrete layer element provided by the solid electrolyte;
wherein the first, second and third discrete layer elements provide the stack of discrete layer elements.

By using the second discrete layer element as a mask during etching of the third layer, the quality of the interface between the second and third layers may be maintained. Thus, contamination and/or degradation of the surface of the electrolyte layer that may typically occur if the electrolyte is etched before deposition of the second layer may be avoided (such contamination and/or degradation may arise, for example, through oxidation of the electrolyte surface or incomplete removal of a photoresist resin from the electrolyte surface).

For the avoidance of doubt, the step of using the second discrete layer element as an etching mask refers to the fact that the dimensions of the mask are defined by the perimeter of the second discrete layer element. It is intended that the first discrete layer element is typically also present during etching of the third layer, although its perimeter may not correspond exactly to that of the etching mask provided by the second discrete element layer.

Typically, the second material comprises at least 98 atomic % amorphous silicon, preferably at least 99 atomic % amorphous silicon. In certain cases, the second material consists essentially of amorphous silicon. The term "amorphous" denotes that the silicon atoms of the second material do not exhibit long-range structural order.

Surprisingly, it has been found that when a discrete layer element comprising at least 95 atomic % amorphous silicon (referred to hereafter as an "amorphous silicon layer element" and corresponding to the second discrete layer element) is used as a mask during etching of the electrolyte layer, the amorphous silicon material retains its ability to function as the anode of a battery. This is unexpected, since it is well-known that the performance of, for example, silicon solar cells, deteriorates when the silicon is exposed to humidity (as a result, it is generally considered necessary to provide an encapsulating element to inhibit moisture ingress into the cell).

Thus, the second layer may be deposited directly in the required thickness of at least 500 nm to provide the anode. This is considered to be the minimum anode thickness to provide an operational battery having useful capacity levels.

This minimum thickness is thought to help balance capacity ratios between the cathode and the anode of a battery. That is, this minimum thickness is thought to limit the relative volume expansion of the amorphous silicon material when it functions as an anode in a battery, this volume expansion arising from the lithiation of the amorphous silicon material during charging of the battery.

The use of a full-thickness amorphous silicon element as an etching mask is in contrast to the method described in U.S. Pat. No. 9,373,864, in which a pattern made from, for example, a silicon layer having a thickness between 5 and 100 nm is used as an etching mask for etching an electrolyte layer. After this etching process, a lithium-based layer is deposited on the pattern, the lithium atoms diffusing into the pattern, such that the lithium-based layer and the pattern form a lithium-based electrode.

The present invention avoids the complicating step of forming a lithium-based electrode after the etching process. Furthermore, the present invention may allow the deposition of a current collector (as the first layer) directly on the layer comprising at least 95 atomic % amorphous silicon (that is, the second layer) before step of etching the electrolyte. This may help to maintain the quality of the interface between the second layer and the current collector.

The term "discrete layer element" is intended to refer to a portion of a layer that has a defined perimeter and that is not in direct contact with any other portion of that layer. A discrete layer element typically has a substantially square, rectangular, or circular perimeter. Typically, each discrete layer element provides a component of a battery.

In certain examples of the method of the invention, the method may additionally comprise the step, after the step of etching the third layer, of modifying the second discrete layer element, to provide a modified second discrete layer element, wherein the modified second discrete layer element has a perimeter that encompasses a smaller area than the area encompassed by the perimeter of the second discrete layer element.

For example, the method of the invention may additionally comprise the step, after the step of etching the third layer, of trimming the second discrete layer element about at least a portion of its perimeter to provide a modified second discrete layer element.

The step of trimming the second discrete layer element may help to remove any peripheral portions of the element that may have been damaged through the step of etching the third layer, thus further improving the ability of the second discrete layer element to provide a good-quality anode.

In certain cases, it has been found that the step of etching the third layer using the second discrete layer element as an etching mask has the result that the etchant undercuts the etching mask. That is, the etchant removes electrolyte that was originally in contact with the mask at the perimeter of the mask. When the stack of discrete layer elements is incorporated into a battery, this loss of electrolyte at the perimeter of the second discrete layer element may have the result that the electrolyte no longer provides an effective separator between the cathode and anode, such that a short-circuit occurs.

In order to help prevent this and to assist the electrolyte in providing an effective separator between the cathode and anode, it is preferable that the step of trimming the second discrete layer element results in the modified second discrete layer element being located entirely within a boundary defined by the perimeter of the third discrete layer element. For example, the modified second discrete layer element may have a perimeter that conforms to that of the third discrete layer element.

The step of trimming the second discrete layer element about at least a portion of its perimeter may comprise an etching process. Etching may be carried out using a dry etching treatment, such as a plasma etching treatment. The etching treatment may be mechanical (such as ion beam milling using, for example, an argon plasma) and/or chemical (for example, reactive ion etching, in which species such as $SF_6$ are used for their ability to react with the first and/or second layers to produce a volatile reaction product). For example, in certain cases, the plasma etching treatment is carried out using a plasma comprising argon and/or $SF_6$.

In other cases, trimming may be carried out through laser ablation, for example.

In general, during the step of trimming the second discrete layer element, the first discrete layer element is also trimmed about at least a portion of its perimeter, to provide a modified first discrete layer element.

In certain cases, the first and second discrete layer elements may be trimmed through an etching process in which part of the surface of the first discrete layer element that faces away from the second discrete layer element is protected by a mask and the etchant removes the exposed portion of the first discrete layer element and the underlying portion of the second discrete layer element.

Typically, in the case that the first and second discrete layer elements are trimmed in a single procedure, this procedure comprises a photolithography process. In this procedure, a photoresist layer may be applied to a surface of the first discrete layer element and exposed to a pattern of light that causes chemical changes within certain portions of the photoresist layer. A solvent (that is, a developer solution) may then be applied to the photoresist layer, whose effect varies depending on the chemical changes caused by the light pattern (for example, a positive tone photoresist layer becomes more soluble in developer solution after exposure to UV light, while a negative photoresist layer becomes less soluble in developer solution after exposure to UV light). Thus, a masking layer may be provided on the surface of the first discrete layer element, the masking layer leaving at least a portion of the first discrete layer element exposed, the exposed portion of the first discrete layer element extending about at least a portion of the perimeter of the first discrete layer element. Thus, selective etching of the first discrete layer element may be performed, followed by etching of the portions of the second discrete layer element that become exposed during this process.

In certain cases, the second discrete layer element may be trimmed independently of the first discrete layer element. However, this is less preferred.

In other cases, the step of modifying the second discrete layer element may comprise the step of creating a trench in the second discrete layer element, the trench extending in a through-thickness direction of the second discrete layer element and defining a boundary between the modified second discrete layer element and an isolated part of the second discrete layer element, the isolated part extending about at least a portion of the perimeter of the second discrete layer element.

Typically, in such cases, the modified second discrete layer element is configured to allow it to be connected electrically to an external device, whereas the isolated part of the second discrete layer element is configured to remain isolated from this external device. For example, the modified second discrete layer element may provide part of an anode contact pad.

In general, the trench defines the whole perimeter of the modified second discrete layer element. Effectively, in such cases, the trench forms a closed loop. In such cases, the isolated part of the second discrete layer element generally extends about the whole of the perimeter of the second discrete layer element.

In general, the trench has a base and sidewalls extending away from the base. The sidewalls are generally mutually aligned, but other configurations may be possible, for example, the sidewalls may tend to converge in a direction towards the base of the trench (that is, the trench may taper in a direction towards the base of the trench).

In certain cases, the trench has a base that is in the same plane as the interface between the second discrete layer element and the third discrete layer element. In other cases, the trench extends into the third discrete layer element, such that the base of the trench is within the third discrete layer element.

In general, the trench passes through both the first discrete layer element and the second discrete layer element.

Typically, the trench is created through an etching process. Etching may be carried out using a dry etching treatment, such as a plasma etching treatment. The etching treatment may be mechanical (such as ion beam milling using, for example, an argon plasma) and/or chemical (for example, reactive ion etching, in which species such as $SF_6$ are used for their ability to react with the first and/or second discrete layer elements to produce a volatile reaction product). For example, in certain cases, the plasma etching treatment is carried out using a plasma comprising argon and/or $SF_6$.

In other cases, the trench may be formed through laser ablation, for example.

The step of creating a trench may comprise a photolithography process. For example, a photoresist layer may be applied to a surface of the first discrete layer element and exposed to a pattern of light that causes chemical changes within certain portions of the photoresist layer. A solvent (that is, a developer solution) is then typically applied to the photoresist layer, whose effect varies depending on the chemical changes caused by the light pattern (for example, a positive tone photoresist layer becomes more soluble in developer solution after exposure to UV light, while a negative photoresist layer becomes less soluble in developer solution after exposure to UV light). Thus, a masking layer is typically provided on the surface of the first discrete layer element, the masking layer leaving at least a portion of the first discrete layer element exposed, this portion corresponding to the proposed path of the trench. Thus, selective etching of the first discrete layer element may be performed, followed by etching of the portions of the second discrete layer element that become exposed during this process.

Typically, the width of the trench lies within the range 1-100 µm.

Typically, a cathode layer is provided on a face of the third discrete layer element that is opposed to the second discrete layer element and at least a portion of the trench is created in a part of the second discrete layer element that is directly opposed to the cathode layer.

In certain examples of the method of the invention, the second discrete layer element may be modified both through the step of trimming the second discrete layer element about at least a portion of its perimeter and through the step of creating a trench in the second discrete layer element.

In general, in the method according to the first aspect of the invention, the steps of removing a through-thickness portion of the first layer to form the first discrete layer element and removing a through-thickness portion of the second layer to form the second discrete layer element are carried out in a single procedure. This may help to increase the efficiency of the patterning process.

Typically, the step of removing a through-thickness portion of the first layer to form the first discrete layer element comprises etching the first layer so as to expose a portion of the second layer. Typically, the step of removing a through-thickness portion of the second layer to form the second discrete layer element comprises etching the second layer so as to expose a portion of the third layer. In certain cases, the same etch may be applied to both the first and second layers.

Typically, the step of removing a through-thickness portion of the first layer comprises a photolithography step. That is, a photoresist layer is applied to a surface of the first layer and exposed to a pattern of light that causes chemical changes within certain portions of the photoresist layer. A solvent (that is, a developer solution) is then applied to the photoresist layer, whose effect varies depending on the chemical changes caused by the light pattern (for example, a positive tone photoresist layer becomes more soluble in developer solution after exposure to UV light, while a negative photoresist layer becomes less soluble in developer solution after exposure to UV light). Thus, a masking layer is provided on the surface of the first layer, allowing selective etching of the first layer to be performed.

The first and/or second layers may be etched using a dry etching treatment, such as a plasma etching treatment. The etching treatment may be mechanical (such as ion beam milling using, for example, an argon plasma) and/or chemical (for example, reactive ion etching, in which species such as $SF_6$ are used for their ability to react with the first and/or second layers to produce a volatile reaction product).

For example, in certain cases, the plasma etching treatment is carried out using a plasma comprising argon and/or $SF_6$. It is thought that this plasma demonstrates good etch selectivity between amorphous silicon and the solid electrolyte, that is, it etches the amorphous silicon at a significantly higher rate than the electrolyte, such that the electrolyte layer (that is, the third layer) effectively acts as an etch stop layer.

In certain cases, the plasma etching treatment is carried out using a process gas selected from the group consisting of: argon; a mixture of HBr and $Cl_2$; and $SF_6$.

In other examples of the method according to the invention, the step of removing a through-thickness portion of the second layer to form the second discrete layer element is carried out using laser ablation.

Typically, the step of etching the third layer is carried out using an aqueous etchant. The etchant may have a neutral, alkaline, or acidic pH value. For example, the etchant may be water. In the case that the etchant is an acid, the etchant may be selected from the group consisting of phosphoric acid, sulphuric acid, hydrochloric acid and nitric acid. In the case that the etchant is alkaline, the etchant may be provided by an aqueous solution of potassium hydroxide. It is thought that aqueous etchants demonstrate good etch selectivity between amorphous silicon and the solid electrolyte, that is, they may etch the electrolyte layer (that is, the third layer) at a significantly higher rate than the amorphous silicon layer element.

In certain cases, a cathode layer is provided on a face of the third layer that is opposed to the second layer, the cathode layer being provided by a cathode material. For example, during formation of the stack of layers, the electrolyte layer may be deposited onto the cathode layer. The cathode material may comprise, for example, a crystalline oxide.

The solid electrolyte may be provided by any material that is ionically conductive but electrically insulating. Typically, the solid electrolyte is provided by a material selected from the group consisting of LiPON, LiSiPON, LiSiCON, Thio- LiSiCON, LiPBON, LiBON, an amorphous lithium borosilicate compound, and a doped amorphous lithium borosilicate compound.

The first material is typically selected from the group consisting of platinum, nickel, molybdenum, copper, titanium nitride, aluminium, gold and stainless steel. In the case that the first material is a provided by a single metallic element, the minimum purity of the first material is typically greater than 95 atomic %, preferably greater than 98 atomic %, more preferably greater than 99 atomic %. In such cases, the first material may provide the anode current collector of a battery comprising the stack of discrete layer elements provided by the method of the invention.

In certain cases, the first material is selected from the group consisting of platinum and titanium nitride.

In certain cases, the second layer may have a thickness of at least 700 nm. In certain cases, the second layer may have a thickness of at least 900 nm. Typically, the second layer has a thickness of 2 µm or less. In certain cases, the second layer has a thickness of 3 µm or less. In certain cases, the second layer has a thickness of 5 µm or less. Thus, for example, the second layer may have a thickness in the range 500 nm to 5 µm. In certain cases, the second layer may have a thickness in the range 500 nm to 3 µm. In certain cases, the second layer may have a thickness in the range 700 nm to 3 µm. In certain cases, the second layer may have a thickness in the range 900 nm to 3 µm.

In the case that a cathode layer is provided on a face of the third layer that is opposed to the second layer, the thickness of the cathode layer may be at least twice the thickness of the second layer, in certain cases at least three times the thickness of the second layer. In certain cases, the thickness of the cathode layer may be up to ten times the thickness of the second layer, in certain cases up to eight times the thickness of the second layer. Thus, for example, the thickness of the cathode layer may be 2-10 times the thickness of the second layer, in certain cases 3-8 times the thickness of the second layer.

The ratio of the thicknesses of the cathode layer and the second layer (comprising at least 95 atomic % amorphous silicon) is preferably chosen so as to balance capacity ratios between the anode and cathode of a battery incorporating these layers. That is, this thickness ratio is thought to limit the relative volume expansion of the amorphous silicon when it functions as an anode in a battery, this volume expansion arising from the lithiation of the amorphous silicon during charging of the battery.

Typically, the third layer has a thickness in the range of 1-5 µm. In certain cases, the third layer has a thickness in the range 2-4 µm.

Typically, the first layer has a thickness in the range 100-500 nm. In certain cases, the first layer has a thickness in the range 200-400 nm.

In general, the method of the invention may provide a plurality of the stacks of discrete layer elements, the plurality of stacks of discrete layer elements being displaced from each other in the plane of the first, second and/or third layer. Typically, the plurality of stacks of discrete layer elements are arranged on a wafer in a regular array.

In a second aspect, the present invention may provide an electrochemical cell comprising at least the following discrete layer elements stacked in the following order:
a first discrete layer element provided by a first material;
a second discrete layer element having a thickness of at least 500 nm and being provided by a second material comprising at least 95 atomic % amorphous silicon;
a third discrete layer element provided by a solid electrolyte; and
a fourth discrete layer element comprising a cathode active material;
wherein a trench is provided in a through-thickness direction of the second discrete layer element, the trench having a base that is either at the interface between the second and third discrete layer elements or within the third discrete layer element,
the trench defining a boundary between a modified second discrete layer element and an isolated part of the second discrete layer element, the isolated part extending about at least a portion of the perimeter of the second discrete layer element.

Typically, the trench defines the entire perimeter of the modified second discrete layer element.

Typically, the width of the trench lies within the range 1-100 µm.

Typically, the trench additionally extends through the first discrete layer element.

Typically, the trench has sidewalls extending from the base, the sidewalls being mutually-aligned.

Typically, at least a portion of the trench is provided in a part of the second discrete layer element that is located directly opposite the fourth discrete layer element.

The solid electrolyte may be provided by any material that is ionically conductive but electrically insulating. Typically, the solid electrolyte is provided by a material selected from the group consisting of LiPON, LiSiPON, LiSiCON, Thio-LiSiCON, LiPBON, LiBON, an amorphous lithium borosilicate compound, and a doped amorphous lithium borosilicate compound.

The first material is typically selected from the group consisting of platinum, nickel, molybdenum, copper, titanium nitride, aluminium, gold and stainless steel. In the case that the first material is a provided by a single metallic element, the minimum purity of the first material is typically greater than 95 atomic %, preferably greater than 98 atomic %, more preferably greater than 99 atomic %.

In certain cases, the first material is selected from the group consisting of platinum and titanium nitride.

Typically, the first discrete layer element provides an anode current collector for the electrochemical cell.

In general, the cathode active material is provided by a crystalline oxide.

Typically, the second material comprises at least 98 atomic % amorphous silicon, preferably at least 99 atomic % amorphous silicon. In certain cases, the second material consists essentially of amorphous silicon. The term "amorphous" denotes that the silicon atoms of the second material do not exhibit long-range structural order.

In certain cases, the second discrete layer element may have a thickness of at least 700 nm. In certain cases, the second discrete layer element may have a thickness of at least 900 nm. Typically, the second discrete layer element has a thickness of 2 µm or less. In certain cases, the second discrete layer element has a thickness of 3 µm or less. In certain cases, the second discrete layer element has a thickness of 5 µm or less. Thus, for example, the second discrete layer element may have a thickness in the range 500 nm to 5 µm. In certain cases, the second discrete layer element may have a thickness in the range 500 nm to 3 µm. In certain cases, the second discrete layer element may have a thickness in the range 700 nm to 3 µm. In certain cases, the second discrete layer element may have a thickness in the range 900 nm to 3 µm.

In certain cases, the thickness of the fourth discrete layer element may be at least twice the thickness of the second discrete layer element, in certain cases at least three times the thickness of the second discrete layer element. In certain cases, the thickness of the fourth discrete layer element may be up to ten times the thickness of the second discrete layer element, in certain cases up to eight times the thickness of the second discrete layer element. Thus, for example, the thickness of the fourth discrete layer element may be 2-10 times the thickness of the second discrete layer element, in certain cases 3-8 times the thickness of the second discrete layer element.

The ratio of the thicknesses of the fourth discrete layer element (comprising the cathode active material) and the second discrete layer element (comprising at least 95 atomic % amorphous silicon) is preferably chosen so as to balance capacity ratios between the anode and cathode of the electrochemical cell. That is, this thickness ratio is thought to limit the relative volume expansion of the amorphous silicon when it functions as the anode of the cell, this volume expansion arising from the lithiation of the amorphous silicon during charging of the cell.

Typically, the third discrete layer element has a thickness in the range of 1-5 μm. In certain cases, the third discrete layer element has a thickness in the range 2-4 μm.

Typically, the first discrete layer element has a thickness in the range 100-500 nm. In certain cases, the first discrete layer element has a thickness in the range 200-400 nm.

DETAILED DESCRIPTION

The invention will now be described by way of example with reference to the following Figures in which:

FIGS. 1 to 7 show schematic cross-sectional views of assembled battery components at various stages of manufacture of a battery incorporating a process according to a first example of the method of the invention;

FIG. 8 shows a schematic cross-sectional view of a battery manufactured according to a process incorporating the first example of the method according to the invention;

Figure 9:
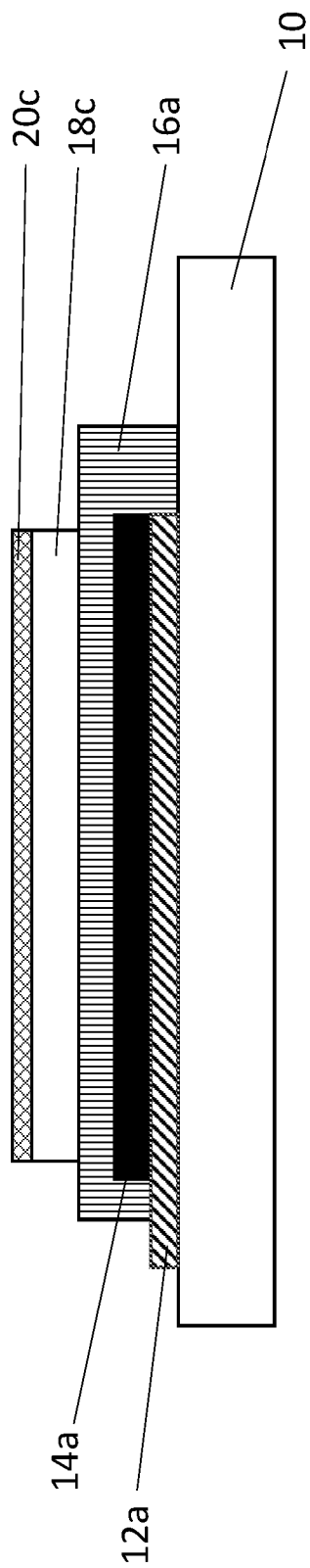
FIG. 9 shows a schematic cross-sectional view of a battery manufactured according to a process incorporating a second example of the method according to the invention.

Referring to FIGS. 1-8, the manufacture of a battery incorporating a process according to a first example of the method of the invention comprises providing a substrate 10 and depositing a layer 12 on a surface of the substrate. Layer 12 comprises an adhesion layer and a metal layer. Layer 12 is subsequently etched through a photolithographic procedure to provide a cathode current collector 12a. The photolithographic procedure comprises the deposition of a photoresist layer (not shown) onto the surface of layer 12, treatment of the photoresist layer to form a mask, followed by etching using ion beam milling or wet chemical etching and subsequent removal of the photoresist layer.

The substrate 10 is typically provided by a sapphire (aluminium oxide) wafer, but other materials, such as silicon, glass, or ceramics may be used. When a silicon substrate is used, this may have a passivation layer such as silicon nitride or silicon oxide. The substrate may be provided by a wafer of non-conductive, semi-conductive, or conductive material. In the case that the substrate is provided by a wafer of semi-conductive or conductive material, it is preferred that the surface of the wafer in contact with the cathode current collector 12 is provided with a non-conductive film.

Referring to FIGS. 3 and 4, a cathode layer 14 is deposited onto the cathode current collector 12a as well as the uncovered surface of the substrate 10 (suitable cathode materials are known in the art). The cathode layer is subsequently etched through a photolithographic procedure to provide a cathode 14a that has a similar footprint to the cathode current collector 12a (for example, the cathode may be generally slightly larger than the cathode current collector, while leaving a portion of the cathode current collector uncovered, so as to provide a contact pad to allow connection of the battery to external devices). The photolithographic procedure comprises the deposition of a photoresist layer (not shown) onto the surface of layer 14, treatment of the photoresist layer to form a mask, followed by etching of layer 14, and removal of the photoresist layer.

Referring to FIG. 5, a LiPON electrolyte layer 16 is deposited onto the cathode 14a as well as any uncovered surfaces of the cathode current collector 12a and the substrate 10 through radio-frequency sputtering to a thickness of 3 μm. An amorphous silicon (a-Si) layer 18 is deposited on the electrolyte layer 16 to a thickness of 1 μm using electron beam physical vapour deposition from a target having a purity of at least 99 atomic %. A platinum layer 20 is deposited on the silicon layer 18 to a thickness of 300 nm using direct-current sputtering from a target having a purity of at least 99.99 atomic %. The LiPON electrolyte layer 16, amorphous silicon layer 18 and platinum layer 20 are deposited sequentially without removing the sample from the vacuum chamber. This assists in preventing contamination of the interfaces between the layers 16, 18 and 20.

Referring to FIG. 6, the platinum layer 20 and the amorphous silicon layer 18 are etched in a single photolithographic procedure to provide an anode current collector 20a and an anode 18a respectively. The photolithographic procedure comprises the deposition of a photoresist layer (not shown) onto the surface of layer 20, treatment of the photoresist layer to form a mask, followed by reactive ion etching with an inductively coupled plasma comprising $SF_6$, and removal of the photoresist layer. The footprint of the current collector 20a and the anode 18a on the substrate 10 is greater than that of the cathode 14a.

Referring to FIG. 7, the electrolyte layer 16 is etched using water as an etchant and the combined current collector 20a and anode 18a as a hard mask. The aqueous etchant tends to undercut the hard mask, such that the etched electrolyte layer 16a has a smaller footprint on the substrate 10 than the current collector 20a and the anode 18a. That is, the anode 18a tends to overhang the etched electrolyte layer 16a. However, the footprint of the etched electrolyte layer 16a remains greater than that of the cathode 14a, such that the cathode 14a is entirely enclosed by the cathode current collector 12a and the etched electrode layer 16a.

Referring to FIG. 8, the current collector 20a and the anode 18a are trimmed using a photolithographic process to provide a trimmed current collector 20b and a trimmed anode 18b. Thus, the footprint of the current collector and the anode on the substrate is reduced to match that of the etched electrolyte 16a (alternatively, the footprint of the current collector and the anode on the substrate may be reduced to be smaller than that of the etched electrolyte, as shown in FIG. 9, in which the footprint of trimmed current collector 20c and trimmed anode 18c is less than that of etched electrolyte 16a). That is, the trimmed anode 20b no longer overhangs the etched electrolyte 16a. The trimming procedure comprises the deposition of a photoresist layer (not shown) onto the surface of layer 20, treatment of the photoresist layer to form a mask, followed by reactive ion etching with an inductively coupled plasma comprising $SF_6$, and removal of the photoresist layer.

It is thought that the trimming process provides one or both of the following advantages:

The extent of overhang of the anode 18a over the etched electrolyte 16a is reduced or eliminated, such that the risk of a short circuit between cathode 14a and the trimmed anode 18b (which might otherwise have occurred, for example, through contact between the anode 18a and the cathode current collector 12a) is reduced; and/or Material at the perimeter of the anode that may have been damaged through the action of the aqueous etchant may be partly or wholly removed.

Figure 10:
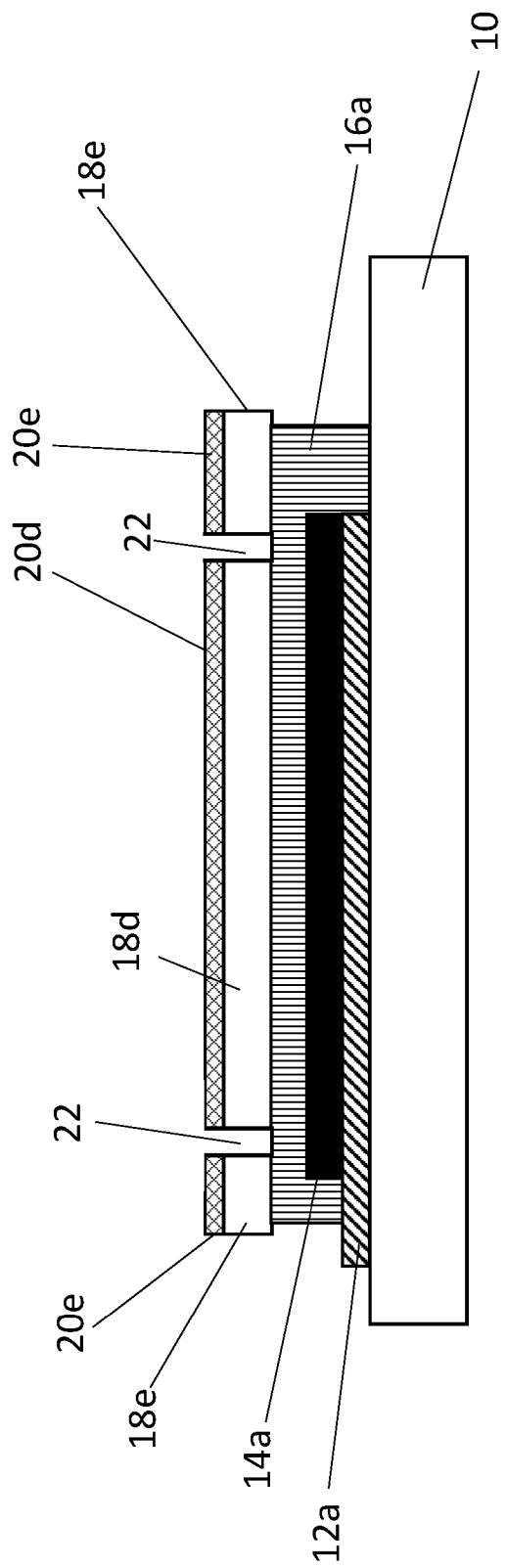
FIG. 10 shows a schematic cross-sectional view of a battery manufactured according to a process incorporating a third example of the method according to the invention.

In an alternative example of the method according to the invention, battery components are assembled and configured as described above with reference to FIGS. 1-7, followed by the provision of a battery as shown in FIG. 10.

Referring to FIG. 10, in an alternative example of the method according to the invention, a trench 22 is created in the current collector and the anode, instead of trimming them. The trench lies within the perimeter of the current collector 20a and the anode 18a (as shown in FIG. 7) and forms a closed loop, dividing each of the current collector and the anode into an active portion and an inactive portion. The active portions 18d, 20d of the anode and the current collector are contained within the closed loop provided by the trench, while the inactive portions 18e and 20e of the anode and the current collector lie outside this loop. The outer perimeter of inactive portions 18e,20e effectively coincides with the perimeter of current collector 20a and anode 18a, as shown in FIG. 7.

Effectively, the trench 22 defines the outer perimeters of a modified current collector and modified anode.

The anode contact pad of the battery (not shown) is provided within the trench loop, so that when the battery is connected to an external device, active portions 18d,20d of the anode and current collector form part of the electrical circuit, while inactive portions 18e,20e of the anode and current collector are isolated from the electrical circuit. Thus, although portions 18e,20e of the anode and current collector may overhang the etched electrolyte 16a, the risk of a short circuit in the battery is reduced. Furthermore, although material at the outer perimeter portion 18e of the anode may have been damaged through the action of the aqueous etchant during the etching of the electrolyte layer, this material is isolated from the electrical circuit created when the battery is connected to an external device.

In general, the trench 22 is located directly opposite a section of the cathode 14a, although this is not the case for the portion of the trench 22 that defines the outline of the anode contact pad (not shown). That is, the majority of the trench typically lies within the footprint of the cathode 14a.

The trench is formed through the process of depositing a photoresist layer (not shown) onto the surface of current collector 20a (as shown in FIG. 7) and treating the photoresist layer to form a mask that defines the path to be followed by the trench. This is followed by reactive ion etching with an inductively coupled plasma comprising $SF_6$, and removal of the photoresist layer.

The base of the trench is in the same plane as the interface between the anode and the electrolyte layer 16a. The sidewalls of the trench extend away from the electrolyte layer 16a and are aligned with each other. The width of the trench is typically 50 μm.

Figure 11:
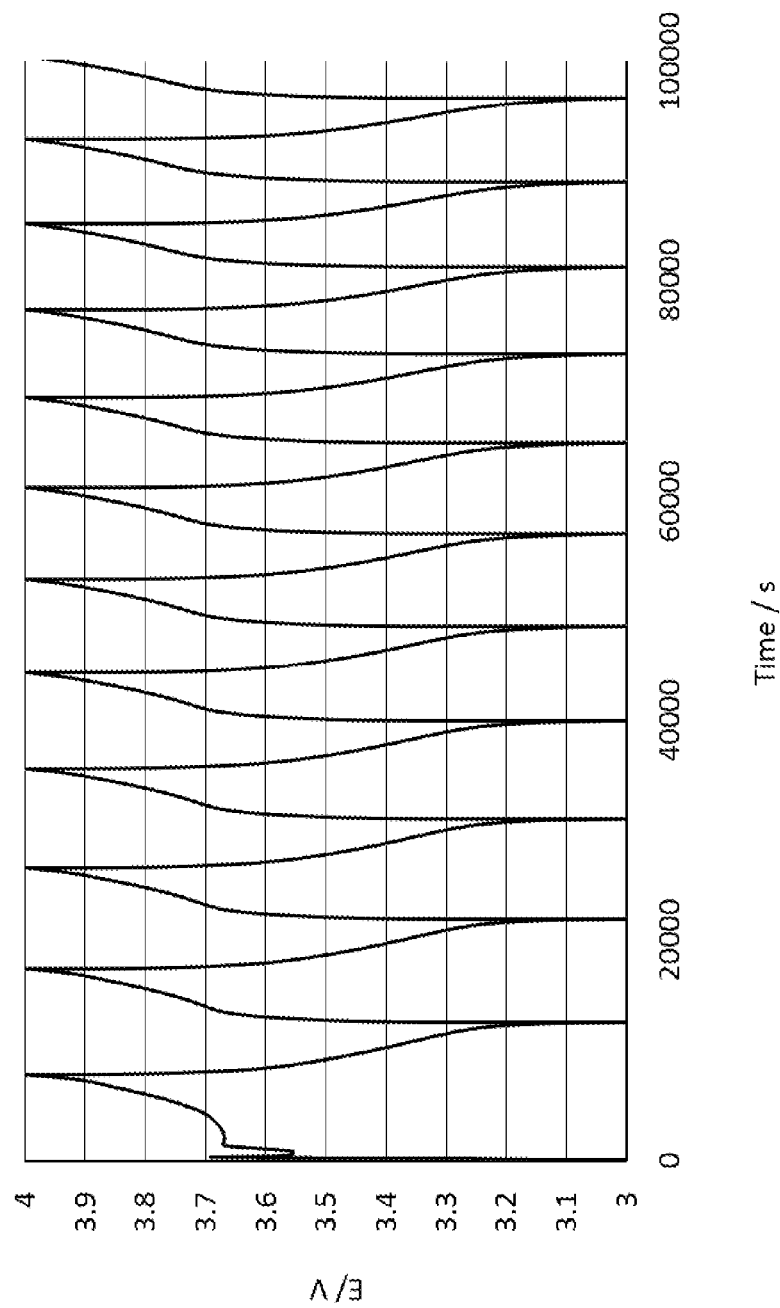
FIG. 11 shows a graph of multiple charge-discharge cycles measured from a battery such as that in FIG. 8, as a plot of voltage against time.

FIG. 11 shows a graph of multiple charge and discharge cycles measured from a battery such as that of FIG. 8, as a plot of voltage against time. This confirms good performance of the battery, indicating that the shaping processes used did not impede or impair its operation. In particular, it is surprising that the use of the combined current collector 20a and anode 18a as a hard mask during etching of the electrolyte layer 16 with water did not have an adverse effect on the performance of the amorphous silicon anode.

Figure 12:
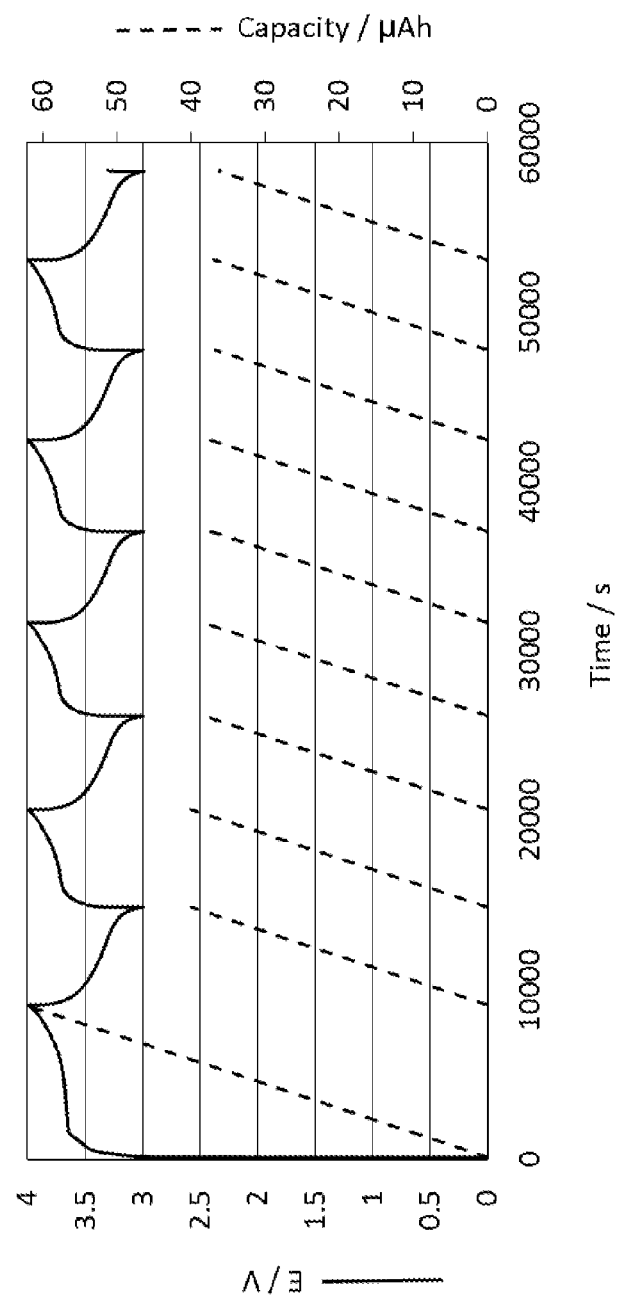
FIG. 12 shows a graph of battery capacity over multiple charge-discharge cycles measured from a battery such as that in FIG. 8.

FIG. 12 shows a graph of data from multiple cycles, as a plot of charge and discharge capacities measured for consecutive cycles for a battery such as that of FIG. 8. The capacity is maintained at a reasonable level over the cycles, with only a small decline which is comparable with expected values for a similar conventionally-fabricated thin-film battery. Again, this confirms good performance of the battery, indicating that the shaping processes used did not impede or impair its operation.

The anode current collector 20a provides an example of a first discrete layer element as formed in the method according to the first aspect of the invention;

The anode 18a provides an example of a second discrete layer element as formed in the method according to the first aspect of the invention;

The etched electrolyte layer 16a provides an example of a third discrete layer element as formed in the method according to the first aspect of the invention;

The trimmed anode 18b provides an example of a modified second discrete layer element, as formed in an optional variant of the method according to the first aspect of the invention;

Active portion 18d of the anode provides a further example of a modified second discrete layer element, as formed in a further optional variant of the method according to the first aspect of the invention.

The invention claimed is:

1. An electrochemical cell comprising at least the following discrete layer elements stacked in the following order:
a first discrete layer element provided by a first material;
a second discrete layer element having a thickness of at least 500 nm and being provided by a second material comprising at least 95 atomic % amorphous silicon;
a third discrete layer element provided by a solid electrolyte; and
a fourth discrete layer element comprising a cathode active material;
wherein a trench is provided in a through-thickness direction of the second discrete layer element, the trench having a base that is either at the interface between the second and third discrete layer elements or within the third discrete layer element,
the trench defining a boundary between a modified second discrete layer element and an isolated part of the second discrete layer element, the isolated part extending about at least a portion of the perimeter of the modified second discrete layer element.

2. The electrochemical cell according to claim 1, wherein the trench defines the entire perimeter of the modified second discrete layer element.

3. The electrochemical cell according to claim 1, wherein the width of the trench lies within the range 1-100 µm.

4. The electrochemical cell according to claim 1, wherein the trench additionally extends through the first discrete layer element.

5. The electrochemical cell according to claim 1, wherein the trench has sidewalls extending from the base, the sidewalls being mutually-aligned.

6. The electrochemical cell according to claim 1, wherein at least a portion of the trench is provided in a part of the second discrete layer element that is located directly opposite the fourth discrete layer element.

\* \* \* \* \*